(12) United States Patent
Deng et al.

(10) Patent No.: US 7,653,535 B2
(45) Date of Patent: Jan. 26, 2010

(54) LEARNING STATISTICALLY CHARACTERIZED RESONANCE TARGETS IN A HIDDEN TRAJECTORY MODEL

(75) Inventors: Li Deng, Sammamish, WA (US); Dong Yu, Kirkland, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 11/303,899

(22) Filed: Dec. 15, 2005

(65) Prior Publication Data

US 2007/0143104 A1 Jun. 21, 2007

(51) Int. Cl.
G10L 19/06 (2006.01)
G10L 19/14 (2006.01)
G10L 11/04 (2006.01)
G10L 15/00 (2006.01)

(52) U.S. Cl. .............. 704/209; 704/205; 704/206; 704/240

(58) Field of Classification Search ........... 704/205, 704/206, 209, 240
See application file for complete search history.

(56) References Cited

U.S. PATENT DOCUMENTS

| | | | | |
|---|---|---|---|---|
| 4,980,917 | A * | 12/1990 | Hutchins | 704/254 |
| 7,050,975 | B2 | 5/2006 | Deng et al. | 704/256.3 |
| 2003/0097266 | A1 * | 5/2003 | Acero | 704/260 |
| 2004/0143435 | A1 | 7/2004 | Deng et al. | 704/256 |
| 2005/0049866 | A1 * | 3/2005 | Deng et al. | 704/240 |
| 2005/0114134 | A1 * | 5/2005 | Deng et al. | 704/255 |
| 2006/0047506 | A1 * | 3/2006 | Deng et al. | 704/209 |
| 2006/0100862 | A1 | 5/2006 | Deng et al. | 704/207 |
| 2006/0111898 | A1 * | 5/2006 | Lee et al. | 704/207 |

OTHER PUBLICATIONS

Minami, Y.; McDermott, E.; Nakamura, A.; Katagiri, S., "Recognition method with parametric trajectory generated from mixture distribution HMMs," Acoustics, Speech, and Signal Processing, 2003. Proceedings. (ICASSP '03). 2003 IEEE International Conference on, vol. 1, no., pp. I-124-I-127 vol. 1, Apr. 6-10, 2003.*

Richmond, Korin (2006): "A trajectory mixture density network for the acoustic-articulatory inversion mapping", In Interspeech-2006.*

Dusan, S., 2000. Statistical estimation of articulatory trajectories from the speech signal using dynamical and phonological constraints. Ph.D. Thesis, Department of Electrical and Computer Engineering, University of Waterloo, Waterloo, Canada, April.*

(Continued)

Primary Examiner—Richemond Dorvil
Assistant Examiner—Michael Ortiz Sanchez
(74) Attorney, Agent, or Firm—Theodore M. Magee; Westman, Champlin, Kelly, P.A.

(57) ABSTRACT

A statistical trajectory speech model is constructed where the targets for vocal tract resonances are represented as random vectors and where the mean vectors of the target distributions are estimated using a likelihood function for joint acoustic observation vectors. The target mean vectors can be estimated without formant data. To form the model, time-dependent filter parameter vectors based on time-dependent coarticulation parameters are constructed that are a function of the ordering and identity of the phones in the phone sequence in each speech utterance. The filter parameter vectors are also a function of the temporal extent of coarticulation and of the speaker's speaking effort.

14 Claims, 5 Drawing Sheets

OTHER PUBLICATIONS

L. Deng and J. Ma, "Spontaneous speech recognition using a statistical coarticulatory model for the hidden vocal-tract-resonance dynamics," J. Acoust. Soc. Amer., vol. 108, No. 6, pp. 3036-3048, Dec. 2000.*

Bilmes, J., "Graphical Models and Automatic Speech Recognition", Mathematical Foundations of Speech and Language Processing, Springer-Verlag New York, Inc., pp. 191-245, 2004.

Chelba et al., C., "Structured language modeling", Computer Speech and Language, vol. 14, pp. 283-332, Oct. 2000.

Deng, L., "A generalized hidden Markov model with state-conditioned trend functions of time for the speech signal", Signal Processing, vol. 27, pp. 65-78, 1992.

Deng, L., "Switching Dynamic System Models for Speech Articulation and Acoustics", Mathematical Foundations of Speech and Language Processing, Springer-Verlag New York, Inc., pp. 115-134, 2004.

Deng et al., L., "Context-dependent Markov model structured by locus equations: Applications to phonetic classification", The Journal of the Acoustical Society of America, vol. 96, No. 4, pp. 2008-2025, Oct. 1994.

Ficus, J. G., "A Post-Processing System to Yield Reduced Word Error Rates: Recognizer Output Voting Error Reduction", 1997 IEEE Workshop on Automatic Speech Recognition and Understanding Proceedings, pp. 347-354, 1997.

Gao et al., Y., "Multistage Coarticulation Model Combining Articulatory, Formant and Cepstral Features", Proceedings of the ICSLP, vol. 1, pp. 25-28, 2000.

Gay, T. "Effect of speaking rate on vowel formant movements", The Journal of the Acoustical Society of America, vol. 63, No. 1, pp. 223-230, Jan. 1978.

Kamm et al., T., "Vocal tract normalization in speech recognition: Compensating for systematic speaker variability", The Journal of the Acoustical Society of America, vol. 97, No. 5, Pt. 2, pp. 3246-3247, May 1995.

Wegmann et al., S., "Speaker Normalization on Conversational Telephone Speech", IEEE International Conference on Acoustics, Speech, and Signal Processing Conference Proceedings, pp. 339-341, May 1996.

Ma et al., J., "A mixed-level switching dynamic system for continuous speech recognition", Computer Speech and Language, vol. 18, pp. 49-65, 2004.

Zweig, G., "Bayesian network structures and inference techniques for automatic speech recognition", Computer Speech and Language, vol. 17, pp. 173-193, 2003.

Bilmes, J. "Buried Markov models: a graphical-modeling approach to automatic speech recognition", Computer Speech and Language, vol. 17, pp. 213-231, 2003.

Siu et al., M., "Parametric Trajectory Mixtures for LVCSR", 5th International Conference on Spoken Language Processing, Sydney, Australia, pp. 3269-3272, 1998.

U.S. Appl. No. 11/093,833, filed Mar. 30, 2005, Acero et al.

Holmes et al., W. J., "Probabilistic-trajectory segmental HMMs", Computer Speech and Language, vol. 13, pp. 3-37, 1999.

Klatt, D. H., "Software for a cascade/parallel formant synthesizer", Journal of the Acoustical Society of America, vol. 67, No. 3, pp. 971-995, Mar. 1980.

Lindblom, B., "Explaining Phonetic Variation: A Sketch of the H & H Theory", Speech Production and Speech Modelling, Kluwer Academic Publishers, pp. 403-439, 1990.

Hajic et al., J., "Core Natural Language Processing Technology Applicable to Multiple Languages", Final Report for Center for Language and Speech Processing, John Hopkins University, 1998.

Pols, L C. W., "Psycho-acoustics and Speech Perception", Computational Models of Speech Pattern Processing, Springer-Verlag Berlin Heidelberg, pp. 10-17, 1999.

Rose et al., R. C., "The potential role of speech production models in automatic speech recognition", Journal of the Acoustical Society of America, vol. 99, No. 3, pp. 1699-1709, Mar. 1996.

Stevens, K. N., "On the quantal nature of speech", Journal of Phonetics, vol. 17, 1989.

Digalakis et al., V., "Rapid Speech Recognizer Adaptation to New Speakers", John Hopkins University, Oct. 1998.

Ostendorf et al., M., "From Hmm's to Segment Models: A Unified View of Stochastic Modeling for Speech Recognition" IEEE Transactions on Speech and Audio Processing, vol. 4, No. 5, pp. 360-378, Sep. 1996.

Bridle et al., J. S., "An Investigation of Segmental Hidden Dynamic Models of Speech Coarticulation for Automatic Speech Recognition," Final Report of a Project at the 1998 Workshop on Language Engineering, Center for Language and Speech Processing, Johns Hopkins University, pp. 1-61, 1998.

Sun et al., J., "An Overlapping-Feature Based Phonological Model Incorporating Linguistic Constraints: Applications to Speech Recognition," Journal of the Acoustic Society of America, vol. 111, No. 2, pp. 1086-1101, Feb. 2002.

Deng et al., L., "A structured Speech Model with Continuous Hidden Dynamics and Prediction-Residual Training for Tracking Vocal Tract Resonances," IEEE Proc. ICASSP, vol. I, pp. 557-560, May 2004.

Deng et al., L., "A Quantitative Model for Formant Dynamics and Contextually Assimilated Reduction in Fluent Speech", ICSLP 2004, Jeju, Korea, 2004.

Eide et al., E., "A Parametric Approach to Vocal Tract Length Normalization," IEEE Proc. ICASSP, pp. 346-348, 1996.

Lee, et al., L., "A Frequency Warping Approach to Speaker Normalization," IEEE Transactions on Speech and Audio Processing, vol. 6, No. 1, pp. 49-60, Jan. 1998.

Ma et al., J., "Efficient Decoding Strategies for Conversational Speech Recognition Using a Constrained Nonlinear State-Space Model," IEEE Transactions on Speech and Audio Processing, vol. 11, No. 6, pp. 590-602, Nov. 2003.

Wang et al., W., "The Use of a Linguistically Motivated Language Model in Conversational Speech Recognition," IEEE Proceedings of International Conference on Acoustics, Speech and Signal Proceedings, vol. 1, pp. 261-264, May 2004.

Welling et al., L., "A Study on Speaker Normalization Using Vocal Tract Normalization and Speaker Adaptive Training", IEEE Proceedings of ICASSP, vol. 2, pp. 797-800, May 1998.

Zhan et al., P., "Speaker Normalization Based on Frequency Warping," IEEE Proceedings of ICASSP, pp. 1039-1042, 1997.

Zhan et al., P., "Vocal Tract Length Normalization for Large Vocabulary Continuous Speech Recognition", CMU-CS-97-148, Carnegie Mellon University, Pittsburgh, PA, May 1997.

Zhou et al., J., "Coarticulation Modeling by Embedding a Target-Directed Hidden Trajectory Model into HMM," IEEE Proceedings of ICASSP, vol. I, pp. 744-747, Apr. 2003.

U.S. Appl. No. 11/069,474, filed Mar. 1, 2005 entitled "Two-Stage Implementation for Phonetic Recognition Using a Bi-Direction Target-Filtering Model of Speech Coarticulation and Reduction".

U.S. Appl. No. 11/071,904, filed Mar. 1, 2005 entitled "Acoustic Models with Structured Hidden Dynamics with Integration Over Many Possible Hidden Trajectories".

U.S. Appl. No. 10/944,262, filed Sep. 17, 2004 entitled "Quantitative Model for Formant Dynamics and Contextually Assimilated Reduction in Fluent Speech".

Lindblom, B., "Spectrographic Study of Vowel Reduction," The Journal of the Acoustical Society of America, vol. 35, No. 11, pp. 1773-1781, Nov. 1963.

van Santen, J. P. H, "Contextual effects on vowel reduction," Speech Communication, vol. 11, No. 6, pp. 513-546, Dec. 1992.

van Bergem, D. R., "Acoustic vowel reduction as a function of sentence accent, word stress and word class," Speech Communications, vol. 12, No. 1, pp. 1-23, Mar. 1993.

Moon et al., S., "Interaction between duration, context, and speaking style in English stressed vowels," The Journal of the Acoustical Society of America, vol. 96, No. 1, pp. 40-55, Jul. 1994.

Pitermann, M., "Effect of speaking rate and contrastive stress on formant dynamics and vowel perception," The Journal of the Acoustical Society of America, vol. 107, No. 6, pp. 3425-3437, Jun. 2000.

Hertz, S. R., "Streams, phones, and transitions: Toward a new phonological and phonetic model of formant timing," Journal of Phonetics, vol. 19, No. 1, pp. 91-109, Jan. 1991.

Wouters et al., J., "Control of Spectral Dynamics in Concatenative Speech Synthesis," IEEE Transactions on Speech and Audio Processing, vol. 9, No. 1, pp. 30-38, Jan. 2001.

Deng, L., "Computational Models for Speech Production," in Computational Models of Speech Pattern Processing, (K. Ponting Ed.), Berlin: Springer, pp. 199-213, 1999.

Ma et al., J. Z., "Target-Directed Mixture Dynamic Models for Spontaneous Speech Recognition," IEEE, Transactions on Speech and Audio Processing, vol. 12, No. 1, pp. 47-58, Jan. 2004.

Deng, Li et al., Speech Processing—*A Dynamic and Optimization-Oriented Approach*, chapter 13, Marcel Dekker Inc., New York, NY, 2003.

Deng et al., L., "A Bi-Directional Target-Filtering Model of Speech Coarticulation and Reduction: Two-Stage Implementation for Phonetic Recognition", IEEE Transactions of Speech and Audio Processing, Jun. 2004.

Deng, et al., L., "Tracking Vocal Tract Resonances Using a Quantized Nonlinear Function Embedded in a Temporal Constraint," IEEE Transactions on Speech and Audio Processing, Mar. 2004.

Deng, L. "A dynamic, feature-based approach to the interface between phonology and phonetics for speech modeling and recognition," Speech Communication, vol. 24, No. 4, pp. 299-323, Mar. 1998.

Deng, L. et al., "A Hidden Trajectory Model with Bi-Directional Target-Filtering: Cascaded vs. Integrated Implementation for Phonetic Recognition," in Proc. ICASSP 05, pp. 337-340, Mar. 19-23, 2005, Philadelphia.

D. Yu et al., "Evaluation of a Long-Contextual-Span Trajectory Model and Phonetic Recognizer Using A* Lattice Search," submitted to Interspeech 2005.

* cited by examiner

LEARNING STATISTICALLY CHARACTERIZED RESONANCE TARGETS IN A HIDDEN TRAJECTORY MODEL

BACKGROUND

A statistical hidden trajectory model uses temporal filtering of hidden vocal tract resonance targets to estimate a hidden trajectory for a vocal tract resonance. The targets used in the hidden trajectory model are described as being stochastic with a phoneme-dependent probability distribution. Thus each phoneme has a mean target and a target variance. In the past, the mean target and the target variance have been determined using a vocal tract resonance tracker.

Using the tracker, hidden trajectory values for individual phonemes are collected and the statistical distribution of the vocal tract resonances is used to identify the means and variances for the targets. Because the vocal tract resonance tracker is not perfect, errors in the vocal tract resonances identified by the tracker are propagated into the target distributions. As a result, the target distributions are incorrect resulting in poor performance of the hidden trajectory model.

The discussion above is merely provided for general background information and is not intended to be used as an aid in determining the scope of the claimed subject matter.

SUMMARY

Means for distributions of target vocal tract resonances are estimated using a likelihood function for an observation vector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
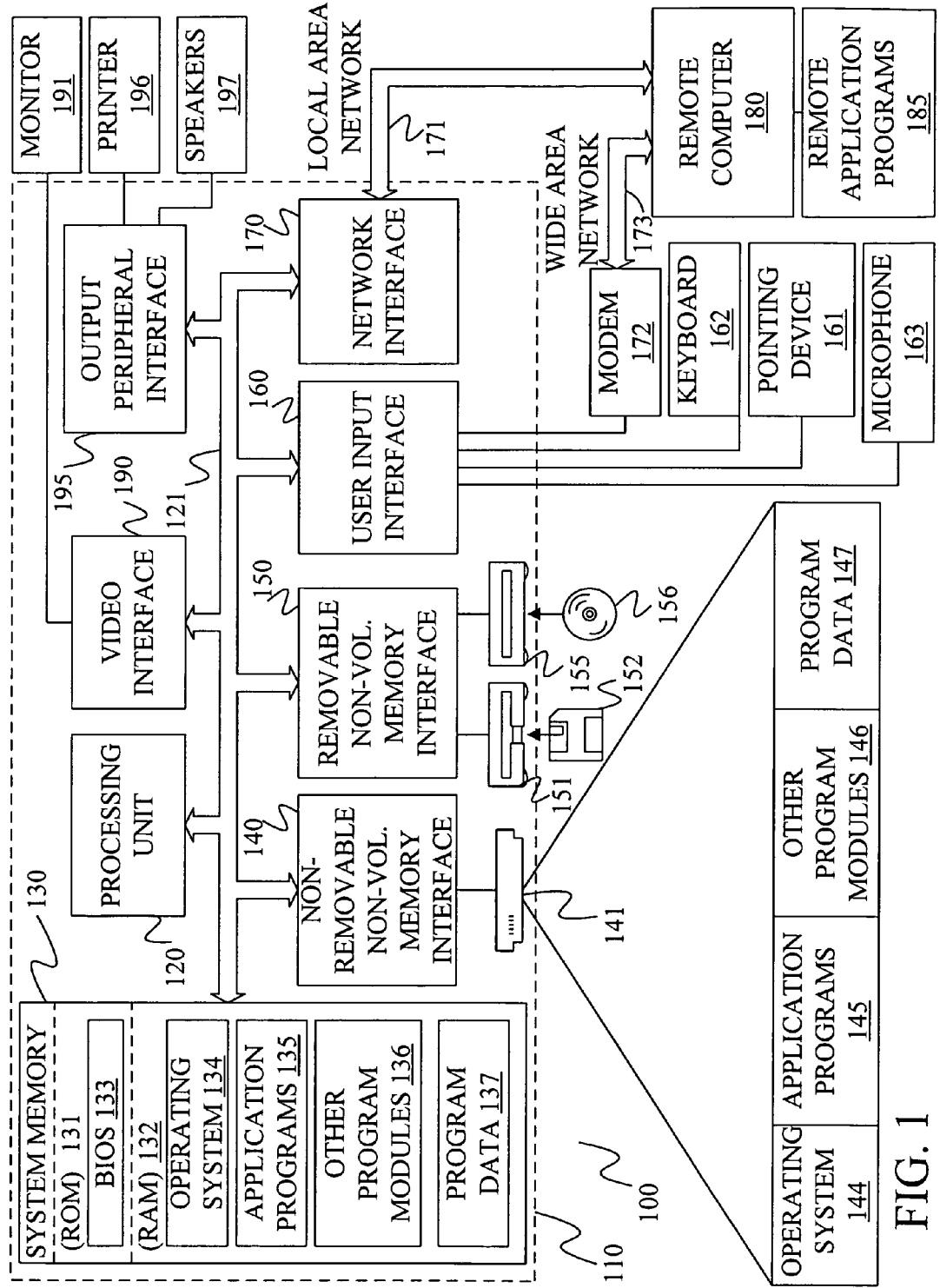
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
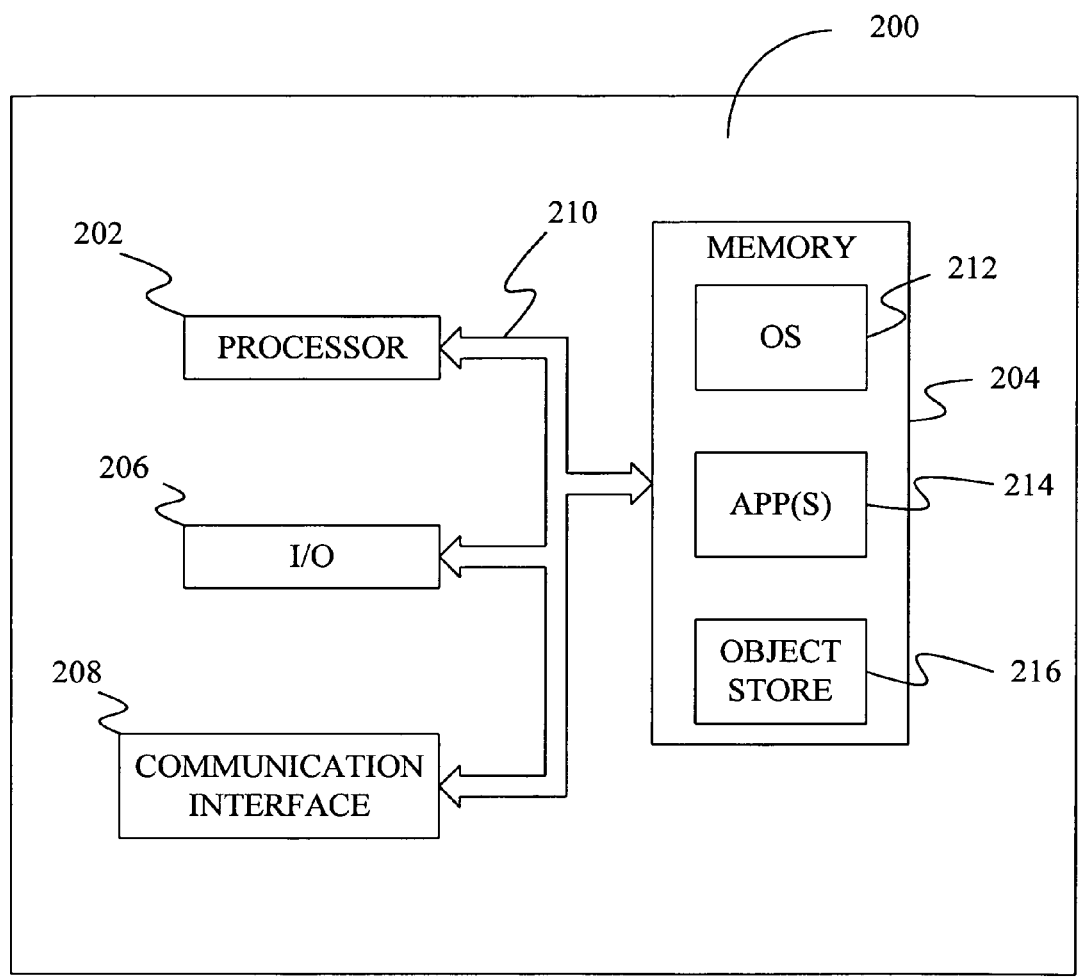
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

A hidden trajectory model is a two stage model that provides a probability of an observation vector given a speech unit such as a phoneme. In the first stage of the model, a probability distribution for vocal tract resonance (VTR) trajectories is described in terms of a filtered sequence of vocal tract resonance (VTR) target distributions. In the second stage of the hidden trajectory model, the probability of an observation vector is described in terms of a non-linear function of the vocal tract resonance trajectory and a residual model.

Under one embodiment, the first stage of the hidden trajectory model describes the vocal tract resonance trajectory as being generated from segmental targets applied to a bi-directional finite impulse response filter as:

$$z_s(k) = h_{s(k)} * t(k) = \sum_{\tau=k-D}^{k+D} c_\gamma \gamma_{s(\tau)}^{|k-\tau|} t_{s(\tau)} \quad \text{EQ. 1}$$

where $z_s(k)$ is the trajectory in the kth time frame for speech unit s, $t_{s(\tau)}$ is the VTR target vector for speech unit s at time frame τ, $\gamma_{s(\tau)}$ is a coarticulation parameter that indicates the spatial extent of coarticulation and is correlated with speaking effort and in one embodiment has a value of 0.6 for all speech units s, and 2D+1 represents the length of the filter's impulse response $h_{s(k)}$ and determines the temporal extent of coarticulation.

Under one embodiment, the speech unit-dependent target vector $t_s$ in EQ. 1 is assumed to be a random vector with a Gaussian distribution:

$$p(t|s) = N(t; \mu_{Ts}, \Sigma_{Ts}) \quad \text{EQ. 2}$$

where $\mu_{Ts}$ is the mean of the target vector and $\Sigma_{Ts}$ is the variance of the target vector, which in many embodiments is assumed to be diagonal. Under one embodiment, the model tracts the frequency and bandwidth of four vocal tract resonances. Under such an embodiment, the mean contains eight components such that $\mu_{Ts} = \{f_1\ f_2\ f_3\ f_4\ b_1\ b_2\ b_3\ b_4\}$, where $f_x$ represents a target frequency and $b_x$ represents a corresponding target bandwidth for a vocal tract resonance.

Due to the linearity between z and t shown in EQ. 1, the assumption that the target vector is a Gaussian leads to the VTR trajectory also being a Gaussian such that:

$$p(z(k)|s) = N[z(k); \mu_{z(k)}, \Sigma_{z(k)}] \quad \text{EQ. 3}$$

Combining EQS. 1, 2 and 3, the mean vector of the Gaussian distribution for the vocal tract resonance trajectory z(k) is derived as:

$$\mu_{z(k)} = \sum_{\tau=k-D}^{k+D} c_\gamma \gamma_{s(\tau)}^{|k-\tau|} \mu_{Ts(\tau)} = a_k \cdot \mu_T \quad \text{EQ. 4}$$

where $a_k$ is a filter parameter vector with individual elements of the vector consisting of equations, $\mu_T$ is a matrix of target means, with a separate row for each speech unit that can be observed during recognition and a separate column for each component of the target vector. In one embodiment, 58 speech units are used. The right hand side of EQ. 4 represents the dot product of filter parameter vector $a_k$ and matrix $\mu_T$.

Figure 3:
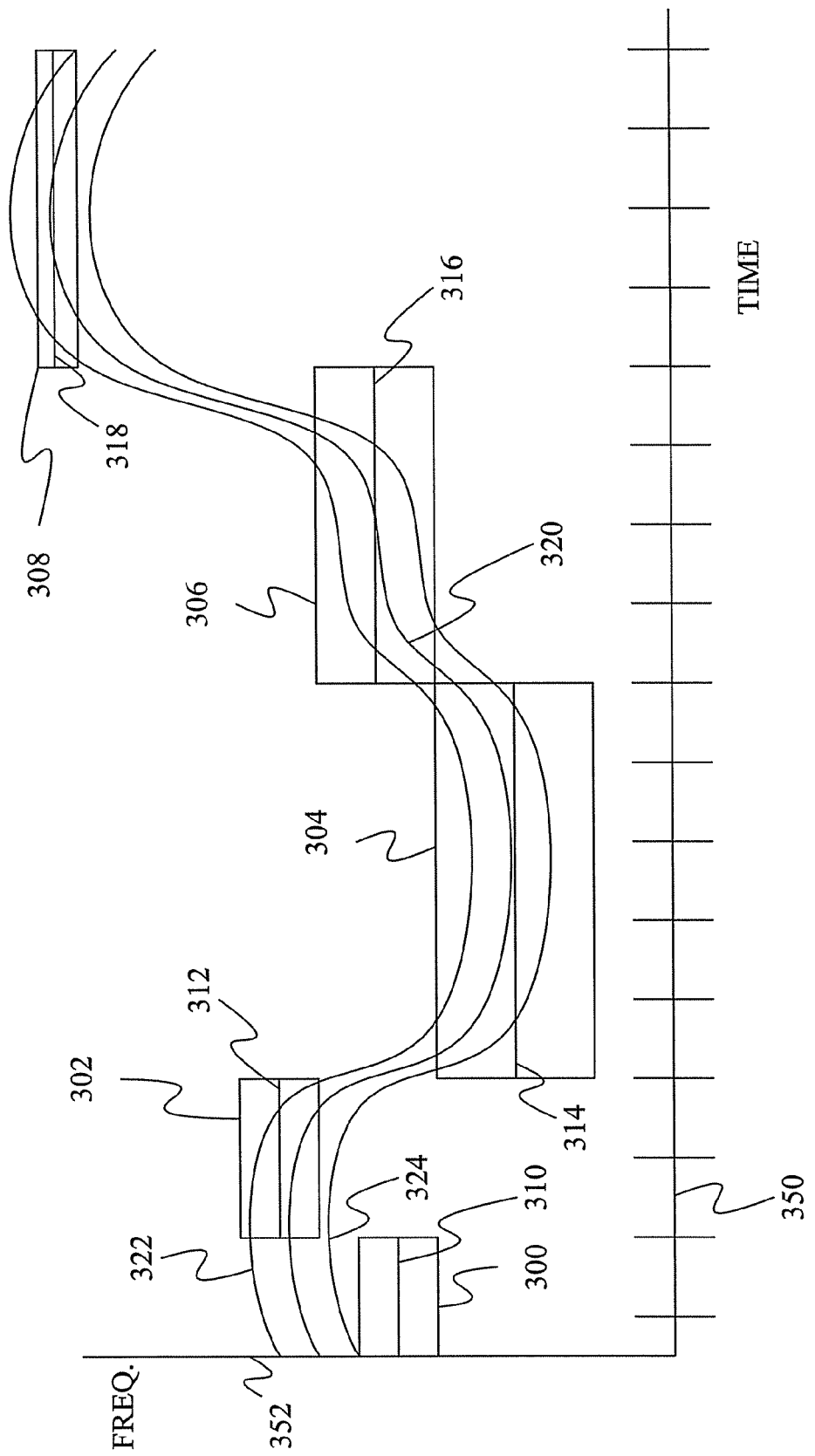
FIG. 3 is a graph showing trajectories and targets for a vocal tract resonance.

The relationship between the VTR trajectory distributions and the target vector distributions is shown in FIG. 3 for a single vocal tract resonance frequency. In FIG. 3, time is shown along horizontal axis 350 and frequency is shown along vertical axis 352.

FIG. 3 shows five target distributions 300, 302, 304, 306 and 308, represented as boxes, having target means 310, 312, 314, 316 and 318 respectively. In FIG. 3, the height of each box representing a target vector distribution provides an indication of the variance of the distribution.

Based on the bi-directional filtering of EQ. 4, the mean for the vocal tract resonance trajectory follows the path 320 and has a variance as indicated by the vertical distance between upper band 322 and lower band 324.

There is no explicit expression for the filter parameter vector $a_k$ in EQ. 4. Instead, each $a_k$ can be constructed based on the ordering and identity of the phones in the phone sequence in the speech utterance. Specifically, each $a_k$ is generated based on an alignment of training speech data with text. This alignment indicates which target means $\mu_{T_s}$ and smoothing parameters $\gamma_S$ are used to determine the current trajectory mean in EQ. 4. Using these alignments, the values of $a_k$ can be determined through an algorithm. For example, if instead of using 58 speech units, 5 speech units were used such that:

$$\mu_T = \begin{bmatrix} \mu_T(1) \\ \mu_T(2) \\ \mu_T(3) \\ \mu_T(4) \\ \mu_T(5) \end{bmatrix} \quad \text{EQ. 5}$$

and the training showed an alignment between speech units and time frames k as:

TABLE 1

| Speech Unit | 1 | | 2 | | 4 | |
|---|---|---|---|---|---|---|
| Frame (k) | 1 | 2 | 3 | 4 | 5 | 6 | the following values for the filter parameters $a_k$ would be obtained:

```
a_1 = [c + cγ_1       cγ_2^2      0    cγ_4^3              0]
a_2 = [cγ_1 + c       cγ_2        0    cγ_4^2 + cγ_4^3     0]
a_3 = [cγ_1^2 + cγ_1   c           0    cγ_4 + cγ_4^2 + cγ_4^3  0]
a_4 = [cγ_1^3 + cγ_1^2 cγ_2        0    c + cγ_4 + cγ_4^2   0]
a_5 = [cγ_1^3          cγ_2^2      0    cγ_4 + c + cγ_4     0]
a_6 = [0               cγ_2^3      0    cγ_4^2 + cγ_4 + c   0]
``` where a filter size of D=3 has been used and each filter parameter vector contains five elements. Using EQ. 4 above, each fth component of $\mu_{z(k)}$ is:

$$\mu_{z(k)}(f) = \sum_{l=1}^{L} a_k(l) \mu_T(l, f) \quad \text{EQ. 6}$$

where l is an index for the speech units, L is the total number of speech units available in the language, which in one embodiment is 58, and f is an index into the frequency and bandwidth components of the target vector.

Similarly, the covariance matrix in EQ. 3 can be similarly derived as:

$$\Sigma_{z(k)} = \sum_{\tau=k-D}^{k+D} c_\gamma^2 \gamma_{s(\tau)}^{2|k-\tau|} \Sigma_{Ts(\tau)} \quad \text{EQ. 7}$$

Approximating the covariance matrix by a diagonal matrix for each speech unit l, the elements of the diagonal are represented a vector:

$$\sigma_{z(k)}^2 = v_k \cdot \sigma_T^2 \quad \text{EQ. 8}$$

where the target covariance matrix is also approximated as diagonal:

$$\Sigma_T(l) \approx \begin{bmatrix} \sigma_T^2(l,1) & 0 & \cdots & 0 \\ 0 & \sigma_T^2(l,2) & \cdots & 0 \\ \vdots & \vdots & \ddots & \vdots \\ 0 & 0 & \cdots & \sigma_T^2(l,8) \end{bmatrix} \quad \text{EQ. 9}$$

with the fth element of the vector in EQ. 8 being:

$$\sigma_{z(k)}^2(f) = \sum_{l=1}^{L} v_k(l) \sigma_T^2(l, f) \quad \text{EQ. 10}$$

Note that in EQS. 6 and 10, $\alpha_k$ and $v_k$ are frame-dependent (k) vectors that are both a function of the speech unit identities and temporal orders in the utterance but that are independent of the vocal tract resonance dimension f.

The second stage of the Hidden Trajectory Model provides a probabilistic mapping from the stochastic Vocal Tract Resonance trajectory z(k) to a stochastic observation trajectory o(k) such that the mapping provides the probability of an observed vector given a hidden trajectory value. Under one embodiment, the observation trajectory takes the form of LPC cepstra and the mapping uses a non-linear prediction function F[z(k)] and a Gaussian residual model $(\mu_{r_{s(k)}}, \Sigma_{r_{s(k)}})$ where $\mu_{r_{s(k)}}$ and $\Sigma_{r_{s(k)}}$ are the mean and covariance, respectively, of the residual model. In one particular embodiment, the mapping is a Gaussian distribution:

$$p(o(k)|z(k), s) = N[o(k); F[z(k)] + \mu_{r_{s(k)}}, \Sigma_{r_{s(k)}}] \quad \text{EQ. 11}$$

where $$F_n[z(k)] = \frac{2}{n} \sum_{p=1}^{P} e^{-\pi n \frac{b_p(k)}{f_s}} \cos\left(2\pi n \frac{f_p(k)}{f_s}\right) \quad \text{EQ. 12}$$

is the value of F[z(k)] for the nth LPC cepstral order, $f_s$ is the sampling frequency of the speech signal, $f_p$ is a vocal tract resonance frequency and $b_p$ is a corresponding vocal tract resonance bandwidth, and P is the number of vocal tract resonance frequencies. As noted above, in one embodiment P=4.

For computational tractability, it is desirable to linearize the non-linear function F[z(k)]. Under one embodiment, this is accomplished using a first order Taylor series expansion such that:

$$F_n[z(k)] \approx F_n[z_o(k)] + F'_n[z_o(k)](z(k) - z_o(k)) \quad \text{EQ. 13}$$

where $F'_n[z_o(k)]$ is the derivative of $F_n[z_o(k)]$ with respect to a VTR dimension, such that:

$$F'_n[f_p(k)] = \delta F_n[z_o(k)] / \delta f_p(k) \quad \text{EQ. 14}$$

$$= -\frac{4\pi}{f_s} e^{-\pi n \frac{b_p(k)}{f_s}} \sin\left(2\pi n \frac{f_p(k)}{f_s}\right)$$

for the pth VTR frequency component of z, and $$F'_n[b_p(k)] = \delta F_n[z_o(k)] / \delta b_p(k) \quad \text{EQ. 15}$$

$$= -\frac{2\pi}{f_s} e^{-\pi n \frac{b_p(k)}{f_s}} \cos\left(2\pi n \frac{f_p(k)}{f_s}\right)$$

for the pth VTR bandwidth component of z.

Under one embodiment, training the VTR target distributions using the two-stage Hidden Trajectory Model involves selecting VTR target distributions that maximize the log-likelihood for a sequence of LPC cepstra observation vectors given a sequence of phonetic units, where the log-likelihood is defined as:

$$P = \sum_{k=1}^{K} \sum_{j=1}^{J} \left\{ -\frac{(o_k(j) - \bar{\mu}_{o_{s(k)}}(j))^2}{\sigma_{o_{s(k)}}^2(j)} \right\} \quad \text{EQ. 16}$$

where K is the number of frames in the training signal, J is the number of orders in the LPC cepstra and $$\bar{\mu}_{o_{s(k)}}(j) = F_n[z_o(k)] + F'_n[z_o(k)][\alpha_k \mu_T - z_o(k)] + \mu_{r_{s(k)}} \quad \text{EQ. 17}$$

and $\sigma_{o_{s(k)}}(j)$ is the jth element along the diagonal matrix:

$$\bar{\Sigma}_{o_{s(k)}} = \Sigma_{r_{s(k)}} + F'_n[z_o(k)] \Sigma_{=}(k) (F'_n[z_o(k)])^{Tr} \quad \text{EQ. 18}$$

where $\Sigma_{r_{s(k)}}$ is assumed to be diagonal.

Taking the derivatives of equation 16 with respect to each VTR target for each speech unit $l_o$ and for each dimension $f_o$, and setting the results equal to zero:

$$\frac{\delta P}{\delta \mu_T(l_o, f_o)} = 0 \quad \text{EQ. 19}$$

results in a 464×464 full-rank linear system of equations, where each equation in the system is described by:

$$\sum_{f} \sum_{l} A(l, f; l_o, f_o) \mu_T(l, f) = \quad \text{EQ. 20}$$

$$\sum_{k=1}^{K} \left\{ \sum_{j=1}^{J} \frac{F'[z_o(k), j, f_o]}{\sigma_{o_{s(k)}}^2(j)} d_k(j) \right\} a_k(l_o)$$

where

-continued $$A(l, f; l_o, f_o) = \sum_{k=1}^{K}\sum_{j=1}^{J} \frac{F'[z_o(k), j, f]F'[z_o(k), j, f_o]}{\sigma^2_{o_{s(k)}}} a_k(l_o)a_k(l) \quad \text{EQ. 21}$$

$$d_k(j) = o_k(j) - F[z_o(k), j] + \sum_f F'[z_o(k), j, f]z_o(k, f) - \mu_{r_{s(k)}}(j) \quad \text{EQ. 22}$$

with each equation in the system having a different combination of $(f_o, l_o)$ where $f_o$ is one of the VTR dimensions and $l_o$ is one of the speech units.

Figure 4:
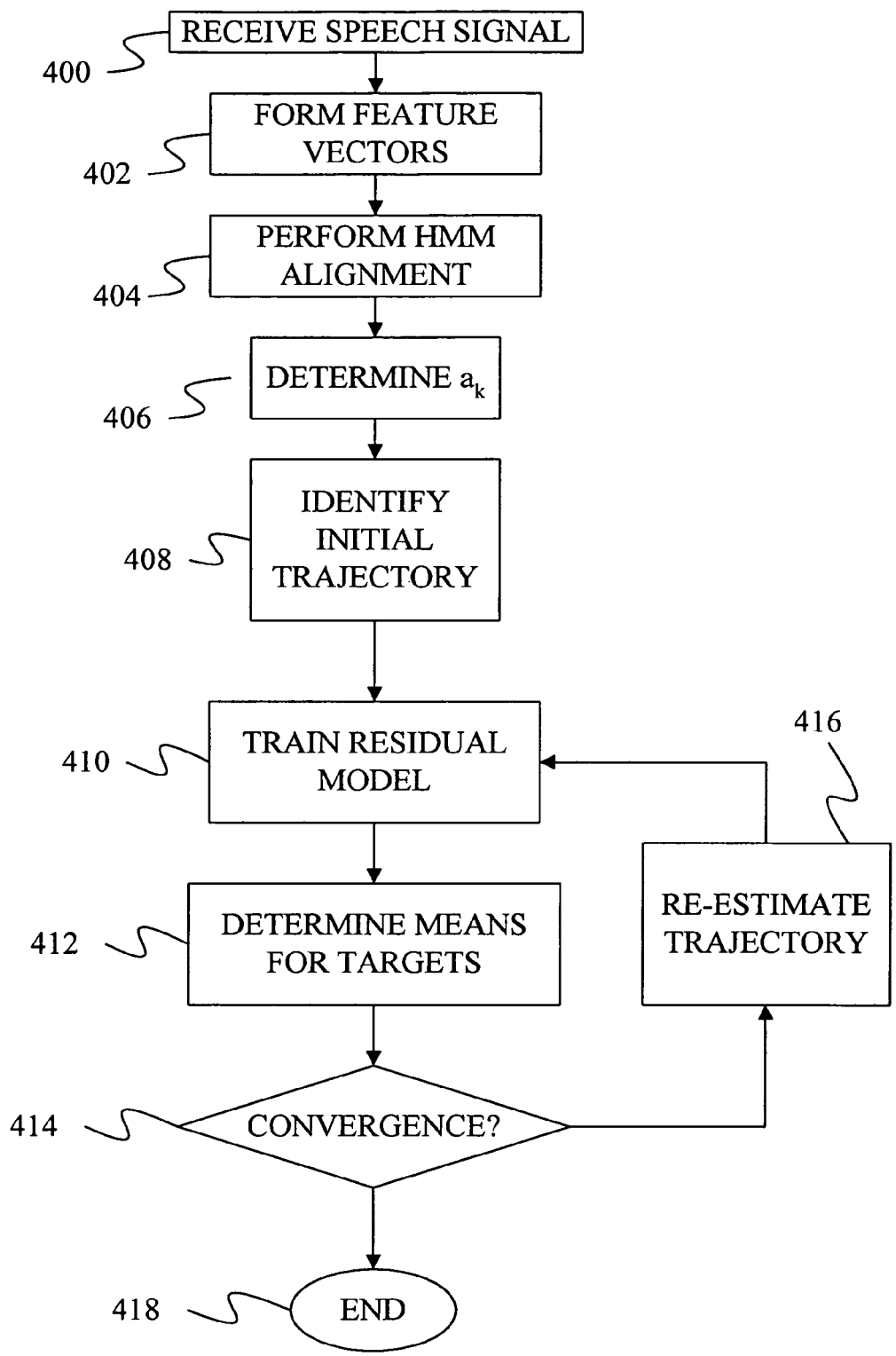
FIG. 4 is a flow diagram for training means for vocal tract resonance targets.
Figure 5:
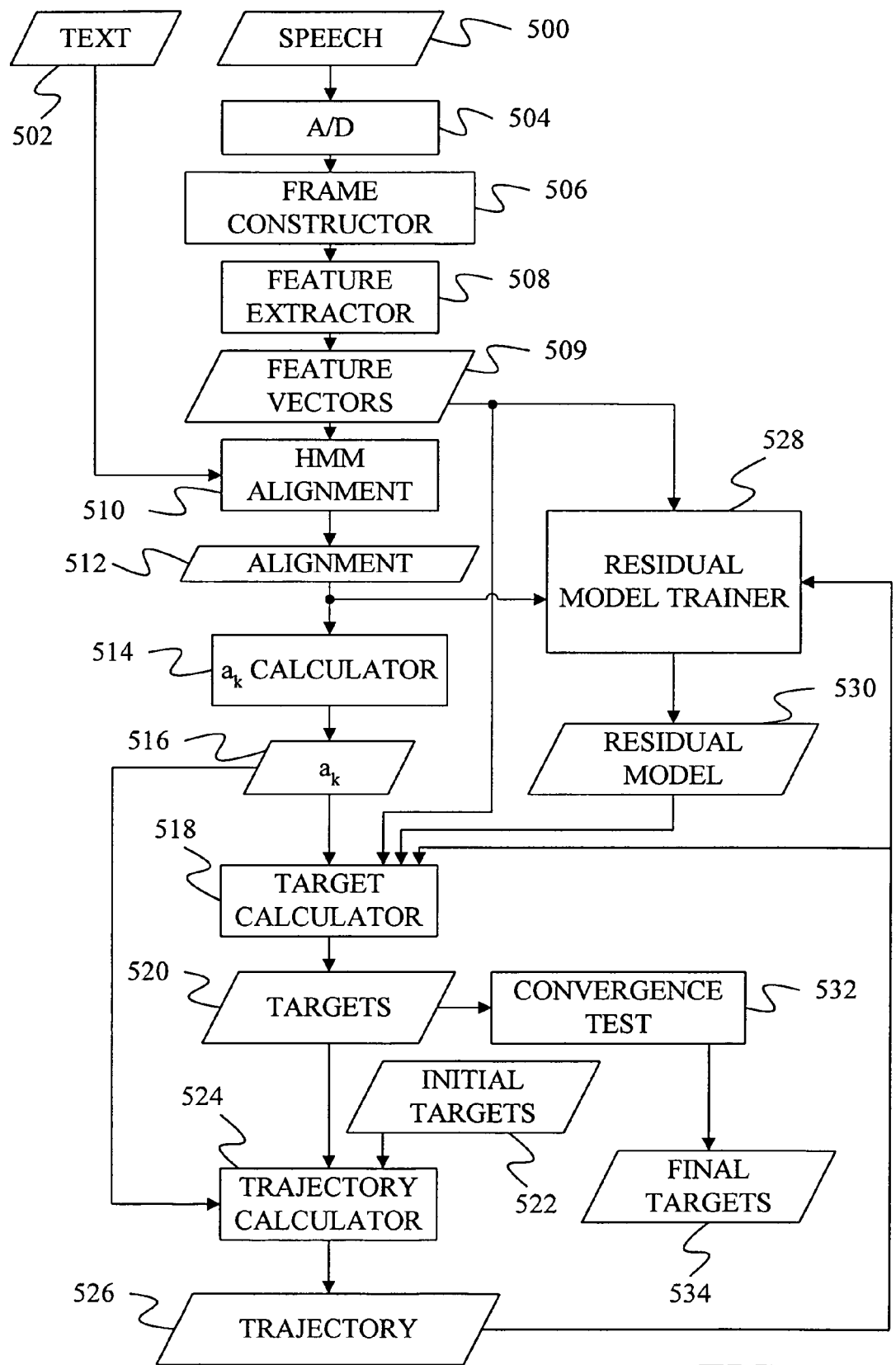
FIG. 5 is a block diagram of elements used in the process of FIG. 4.

FIG. 4 provides a method and FIG. 5 provides an apparatus that are used with the equations above under one embodiment to estimate mean target VTR vectors for a set of speech units such as phonemes.

In step 400, a speech signal 500 generated by a trainer reading from a text 502 is received by an analog-to-digital (A/D) converter 504. At step 402, the speech signal is converted into observed feature vectors 509 by converting the analog signal into digital samples using A/D converter 504, forming frames of digital samples using frame constructor 506, and forming a feature vector for each frame using feature extractor 508. In one embodiment, A/D converter 504 samples the analog speech signal at 16 kHz with 16 bits per sample, thereby creating 32 kilobytes of speech data per second and frame constructor 506 creates a new frame every 10 milliseconds that includes 25 milliseconds worth of data. Under one embodiment, feature extractor 508 extracts Linear Predictive Coding cepstral feature vectors, which are well known in the art.

At step 404, observed feature vectors 509 are aligned with speech units by a Hidden Markov Model (HMM) alignment unit 510. HMM alignment unit 510 uses a dictionary (not shown) to divide text 502 into speech units. It then aligns the sequence of observed feature vectors 509 with the speech units using a Hidden Markov Model (not shown), which describes the probability of each speech unit given the sequence of observed feature vectors 509. This results in an alignment 512 which associates feature vectors (and thereby the frames associated with the feature vectors) with speech units in the training speech signal.

The process of FIG. 4 continues at step 406 where filter parameters $\alpha_k$ are determined for each frame of the speech signal by $\alpha_k$ calculator 514. As noted above, $\alpha_k$ is determined using equation 4 above and alignment 512. Once filter parameters $\alpha_k$ 516 have been determined for each frame k, the process continues at step 408 where an initial trajectory is determined by a trajectory calculator 524.

At step 408, trajectory calculator 524 produces trajectory 526 using initial targets 522, which in one embodiment are generally accepted values for the vocal tract resonances for the various speech units. Trajectory calculator 524 calculates the mean trajectory by applying filter parameters $\alpha_k$ 516 and initial targets 522, as $\mu_T$, to equation 4 above. The resulting mean trajectory is taken as trajectory 526.

At step 410, a residual model 530 is trained by a residual model trainer 528 using trajectory 526. Residual model 530 is trained by taking the difference between an observed feature vector 509 and the feature vector predicted by equation 12 using the corresponding value of trajectory 526. In terms of an equation:

$$r = o(k) - F[z(k)] \quad \text{EQ. 23}$$

where r is the residual and o(k) is the observed feature vector for the kth frame. The residuals, r, are grouped by speech units and the mean and covariance for each group are computed to produce the residual model $(\mu_{r_{s(k)}}, \Sigma_{r_{s(k)}})$ 530.

At step 412, residual model 530 is provided to a target calculator 518 along with observed feature vectors 509, filter parameters $\alpha_k$ 516, and trajectory 526. Target calculator 518 uses the system of equations described by equations 20-22 above, with trajectory 526 used as the Taylor series expansion point $z_o(k)$, to determine the mean vocal tract resonance target vectors 520 of each speech unit.

At step 414, the mean target vectors are assessed by a convergence test 532 to determine if the values have converged. If they have not converged, the mean target vectors are provided to trajectory calculator 524, which uses the mean target vectors in equation 4 above to determine a new sequence of trajectories 526 at step 416. The new trajectory values are then used to retrain residual model 530 at step 410 as described above. The new residual model and the new trajectories are then used to recalculate the mean target vectors at step 412.

Steps 414, 416, 410, and 412 are repeated until the mean target vectors converge at step 414. When the mean target vectors converge, the process ends at step 418 and the mean target vectors are set as the final targets 534.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
implementing a likelihood function using a processor, the likelihood function

$$P = \sum_{k=1}^{K}\sum_{j=1}^{J}\left\{-\frac{(O_k(j) - \bar{\mu}_{o_{s(k)}}(j))^2}{\sigma^2_{o_{s(k)}}(j)}\right\}$$

for a sequence of LPC cepstra observation vectors being utilized to estimate a mean for a distribution of target vocal tract resonances where K is the number of frames in the training signal, J is the number of orders in the LPC cepstra observation vectors $o_k$, $\bar{\mu}_{o_{s(k)}}(j) = F_n[z_0(k)] + F_n'[z_0(k)][\alpha_k\mu_T - Z_0(k)] + \mu_{r_{s(k)}}$ and $\sigma_{o_{s(k)}}(j)$ is the jth element along the diagonal matrix: $\Sigma_{o_{s(k)}} = \Sigma_{r_{s(k)}} + F_n'[z_0(k)]\Sigma_z(k)(F_n'[z_0(k)])^{Tr}$ where $\Sigma_{r_{s(k)}}$ is a covariance of a residual model, $\Sigma_z(k)$ is a covariance of a distribution of vocal tract resonance trajectories, $$F_n[z_0(k)] = \frac{2}{n}\sum_{p=1}^{P} e^{-\pi n\frac{b_p(k)}{f_s}} \cos\left(2\pi n\frac{f_p(k)}{f_s}\right)$$

is for an nth LPC cepstral order for a Taylor series expansion point $z_0(k)$, $f_s$ is a sampling frequency of a speech signal, $f_p$ is a vocal tract resonance frequency and $b_p$ is a corresponding vocal tract resonance bandwidth, $\mu_T$ is a vector of means of target vocal tract resonances, $\alpha_k$ is a filter parameter vector, $\mu_{r_{s(k)}}$ is a mean of the residual model, $F_n'[z_0(k)]$ is the derivative of $F_n[z_0(k)]$ with respect to a vocal tract resonance dimension, wherein utilizing a likelihood function comprises:

forming a plurality of partial derivatives of the likelihood function, the plurality of partial derivatives comprising a separate partial derivative $$\frac{\delta P}{\delta \mu_T(l_o, f_o)}$$

for each combination of a speech unit $l_o$ and a dimension $f_o$ that can be formed from a plurality of speech units and a multi-dimensional target vocal tract resonance vector, each partial derivative being taken with respect to a dimension of a mean target vocal tract resonance vector for a speech unit;

setting each of the plurality of partial derivatives equal to zero $$\frac{\delta P}{\delta \mu_T(l_o, f_o)} = 0$$

to form a system of equations $$\sum_f \sum_l A(l, f; l_o, f_o)\mu_T(l, f) = \sum_{k=1}^{K}\left\{\sum_{j=1}^{J}\frac{F'[z_o(k), j, f_o]}{\sigma_{o_{s(k)}}^2(j)}d_k(j)\right\}a_k(l_o)$$

where $$A(l, f; l_o, f_o) = \sum_{k=1}^{K}\sum_{j=1}^{J}\frac{F'[z_o(k), j, f]F'[z_o(k), j, f_o]}{\sigma_{o_{s(k)}}^2(j)}a_k(l_o)a_k(l) \text{ and}$$

$$d_k(j) = o_k(j) - F[z_o(k), j] + \sum_f F'[z_o(k), j, f]z_o(k, f) - \mu_{r_{s(k)}}(j)$$

with each equation in the system having a different combination of $(f_o, l_o)$; and solving the system of equations to identify a mean for a distribution of target vocal tract resonances for each speech unit of the plurality of speech units.

2. The method of claim 1 wherein estimating a mean for a distribution of target vocal tract resonances comprises estimating a plurality of means for a plurality of distributions such that the estimate of the mean of one distribution influences the estimate of the mean of another distribution.

3. The method of claim 1 wherein the likelihood function is based in part on a model that provides a probability of an observation vector given at least a vocal tract resonance trajectory.

4. The method of claim 3 wherein the mean of a distribution of residual values $\mu_{r_{s(k)}}$ represents a mean difference between observation vectors and a function of a vocal tract resonance trajectory.

5. The method of claim 4 further comprising iterating between updating the mean of the distribution of residual values and updating the mean of the distribution of target vocal tract resonances.

6. The method of claim 5 wherein updating the mean of the distribution of residual values comprises applying the means of a plurality of vocal tract resonance targets to a filter to form a vocal tract resonance trajectory.

7. The method of claim 4 wherein the function of the vocal tract resonance trajectory comprises a non-linear function.

8. A computer-readable storage medium having computer-executable instructions for performing steps comprising:

aligning frames of observed feature vectors with speech units to form an alignment;

using the alignment to select filter parameters $\alpha_k$ for each frame k for a bi-directional finite impulse response filter defined as $$\mu_{z(k)} = \sum_{\tau=k-D}^{k+D} c_\gamma \gamma_{s(\tau)}^{|k-\tau|}\mu_{Ts(\tau)} = a_k \cdot \mu_T$$

where $\mu_{z(k)}$ is a vocal tract resonance trajectory value for a frame k, 2D+1 is the length of the filter's impulse response, and $\mu_T$ is a matrix of target means with a separate row for each speech unit that can be observed during recognition and a separate column for each component of the target vector, wherein $\alpha_k \cdot \mu_T$ represents the dot product of the filter parameters $\alpha_k$ and the matrix of target means $\mu_T$;

determining a vocal tract resonance trajectory value $\mu_{z(k)}$ for each frame using the filter parameter $\alpha_k$ for the frame and the matrix of target means $\mu_T$ in the bi-directional finite impulse response filter $$\mu_{z(k)} = \sum_{\tau=k-D}^{k+D} c_\gamma \gamma_{s(\tau)}^{|k-\tau|}\mu_{Ts(\tau)} = a_k \cdot \mu_T;$$

and using the vocal tract resonance trajectory values to train a residual model that models the difference between observed feature vectors and predicted feature vectors formed based on the vocal tract resonance trajectory values;

using the vocal tract resonance trajectory values and the residual model to solve a set of equations to estimate a plurality of mean target vocal tract resonance values with one mean target vocal tract resonance value for each speech unit in a set of all speech units available in a language.

9. The computer-readable storage medium of claim 8 wherein the value of one mean target vocal tract resonance is dependent on the value of another mean target vocal tract resonance value in the set of equations.

10. The computer-readable storage medium of claim 8 further comprising determining new vocal tract resonance trajectory values based on the mean target vocal tract resonance values and using the new vocal tract resonance trajectory values to train the residual model.

11. The computer-readable storage medium of claim 8 wherein the set of equations is based on maximizing a likelihood function for a sequence of observation vectors.

12. A method comprising:

training a residual model based on the differences between a sequence of observation vectors and values produced from a predictor function using a processor; and implementing the residual model using a processor to estimate a plurality of means for distributions of vocal tract resonances $\mu_T$ by solving a system of equations, each equation defined as $$\sum_f \sum_l A(l, f; l_o, f_o)\mu_T(l, f) =$$

$$\sum_{k=1}^{K} \left\{ \sum_{j=1}^{J} \frac{F'[z_o(k), j, f_o]}{\sigma^2_{o_{s(k)}}(j)} d_k(j) \right\} a_k(l_o) \text{ where}$$

$$A(l, f; l_o, f_o) = \sum_{k=1}^{K} \sum_{j=1}^{J} \frac{F'[z_o(k), j, f] F'[z_o(k), j, f_o]}{\sigma^2_{o_{s(k)}}(j)} a_k(l_o) a_k(l) \text{ and}$$

$$d_k(j) = o_k(j) - F[z_o(k), j] + \sum_f F'[z_o(k), j, f] z_o(k, f) - \mu_{r_{s(k)}}(j)$$

with each equation in the system having a different combination of $(f_0, l_o)$, where $$F[z_0(k), j] = \frac{2}{n} \sum_{p=1}^{P} e^{-\pi n \frac{b_p(k)}{fs}} \cos\left(2\pi n \frac{f_p(k)}{f_s}\right)$$

is for a jth LPC cepstral order for a Taylor series expansion point $z_0(k)$, $f_s$ is a sampling frequency of a speech signal, $f_p$ is a vocal tract resonance frequency and $b_p$ is a corresponding vocal tract resonance bandwidth, $F_n'[z_0(k), j, f]$ is the derivative of $F_n[z_{b\ 0}(k), j]$ with respect to a vocal tract resonance dimension f, $l_0$ is a speech unit, K is the total number of frames, J is the total number of LCP cepstral orders, $\mu_{r_{s(k)}}(j)$ is a mean of the residual model, $\Sigma_{r_{s(k)}}(j)$ is a covariance of the residual model, $o_k(j)$ is the jth order of an observation vector for frame k, a covariance of a distribution of vocal tract resonance trajectories, $\mu_k(l)$ is a component of filter parameter vector for speech unit l and $\sigma_{o_{s(k)}}(j)$ is the jth element along the diagonal matrix: $\Sigma_{o_{s(k)}} = \Sigma_{r_{s(k)}} + F_n'[z_0(k)]\Sigma_z(k)(F_n'[z_0(k)])^{Tr}$ where $\Sigma_z(k)$ is a covariance of a distribution of vocal tract resonance trajectories.

13. The method of claim 12 wherein training a residual model comprises training a residual model based on vocal tract resonance trajectories.

14. The method of claim 13 further comprising forming the vocal tract resonance trajectories by applying a sequence of vocal tract resonance targets to a filter.

* * * * *